United States Patent
Youm (10) Patent No.: US 9,496,549 B2
(45) Date of Patent: Nov. 15, 2016

(54) NEGATIVE ELECTRODE AND RECHARGEABLE LITHIUM BATTERY INCLUDING SAME

(71) Applicant: SAMSUNG SDI CO., LTD., Yongin-si, Gyeonggi-do (KR)

(72) Inventor: Chul Youm, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 66 days.

(21) Appl. No.: 14/538,476

(22) Filed: Nov. 11, 2014

(65) Prior Publication Data

US 2015/0194663 A1    Jul. 9, 2015

(30) Foreign Application Priority Data

Jan. 9, 2014 (KR) ........................ 10-2014-0003042

(51) Int. Cl.

| | | |
|---|---|---|
| H01M 4/36 | (2006.01) | |
| H01M 4/133 | (2010.01) | |
| H01M 4/134 | (2010.01) | |
| H01M 10/052 | (2010.01) | |
| H01M 4/62 | (2006.01) | |
| H01M 10/0567 | (2010.01) | |
| H01M 10/0569 | (2010.01) | |
| H01M 4/587 | (2010.01) | |
| H01M 4/02 | (2006.01) | |
| H01M 4/38 | (2006.01) | |

(52) U.S. Cl.
CPC ............ *H01M 4/366* (2013.01); *H01M 4/133* (2013.01); *H01M 4/134* (2013.01); *H01M 4/587* (2013.01); *H01M 4/625* (2013.01); *H01M 4/628* (2013.01); *H01M 10/052* (2013.01); *H01M 10/0567* (2013.01); *H01M 10/0569* (2013.01); *H01M 4/386* (2013.01); *H01M 2004/021* (2013.01); *H01M 2004/027* (2013.01); *H01M 2220/30* (2013.01); *H01M 2300/0028* (2013.01); *Y02E 60/122* (2013.01); *Y02T 10/7011* (2013.01)

(58) Field of Classification Search
CPC .... H01M 4/366; H01M 4/386; H01M 4/587; H01M 4/133; H01M 4/134; H01M 10/0567; H01M 10/0569; H01M 10/052; H01M 2004/027; Y02E 60/122
See application file for complete search history.

(56) References Cited

U.S. PATENT DOCUMENTS

| | | | |
|---|---|---|---|
| 7,754,385 B2 | 7/2010 | Chang et al. | |
| 2005/0136330 A1* | 6/2005 | Mao ...................... | H01M 4/583 429/231.95 |

(Continued)

FOREIGN PATENT DOCUMENTS

| | | |
|---|---|---|
| JP | 2013-101770 | 5/2013 |
| KR | 10-0666822 | 1/2007 |

(Continued)

OTHER PUBLICATIONS

English machine translation of Japanese Publication No. JP 2013-101770, dated May 23, 2013, 18 pages.

*Primary Examiner* — Laura Weiner
(74) *Attorney, Agent, or Firm* — Lewis Roca Rothgerber Christie LLP (57) ABSTRACT

A negative electrode for a rechargeable lithium battery includes: a current collector; and a negative active material layer on the current collector. The negative active material layer includes a negative active material including a graphite-silicon composite including a graphite particle, a silicon (Si) particle on a surface of the graphite particle, and a carbon coating layer surrounding the graphite particle on the surface of the silicon (Si) particle. A rechargeable lithium battery includes the negative electrode.

14 Claims, 5 Drawing Sheets

(56) References Cited

U.S. PATENT DOCUMENTS

2006/0008706 A1* 1/2006 Yamaguchi ........... H01M 4/133
                                                        429/313
2012/0115044 A1   5/2012 Yamaguchi et al.

FOREIGN PATENT DOCUMENTS

| KR | 10-0684729 | | 2/2007 |
| KR | 1020090086456 | * | 8/2009 |

* cited by examiner

NEGATIVE ELECTRODE AND RECHARGEABLE LITHIUM BATTERY INCLUDING SAME

CROSS-REFERENCE TO RELATED APPLICATION

This application claims priority to and the benefit of Korean Patent Application No. 10-2014-0003042 filed in the Korean Intellectual Property Office on Jan. 9, 2014, the entire content of which is incorporated herein by reference.

BACKGROUND

1. Field

Embodiments of the present disclosure relate to a negative electrode for a rechargeable lithium battery and a rechargeable lithium battery.

2. Description of the Related Art

A rechargeable lithium battery has drawn attention as a power source for small, portable electronic devices. The rechargeable lithium battery includes an organic electrolyte solution and has a high discharge voltage that is two or more times greater than that of a conventional battery that includes an alkali aqueous solution. Accordingly, a rechargeable lithium battery has a high energy density.

Such a rechargeable lithium battery is manufactured by injecting an electrolyte into an electrode assembly, which includes a positive electrode including a positive active material capable of intercalating/deintercalating lithium ions and a negative electrode including a negative active material capable of intercalating/deintercalating lithium ions.

As the negative active material, various carbon-based materials such as artificial graphite, natural graphite, and hard carbon have been used. Recently, there have been researches on a non-carbon-based negative active material such as silicon (Si) in accordance with needs for stability and high capacity.

SUMMARY

One aspect of an embodiment of the present invention is directed toward a high power negative electrode for a rechargeable lithium battery having uniform (or substantially uniform) current density characteristics.

Another aspect of an embodiment of the present invention is directed toward a rechargeable lithium battery including the negative electrode.

According to one embodiment of the present invention, a negative electrode for a rechargeable lithium battery includes a current collector; and a negative active material layer on the current collector.

The negative active material layer may include a negative active material including a graphite-silicon composite.

The graphite-silicon composite may include a graphite particle, a silicon (Si) particle on a surface of the graphite particle, and a carbon coating layer surrounding the Si particle on the surface of the graphite particle.

The silicon (Si) particle may be present in the graphite-silicon composite in an amount of about 0.5 wt % to about 3.5 wt % based on the total amount of the graphite-silicon composite.

The silicon (Si) particle may be present in the graphite-silicon composite in an amount of about 1.0 wt % to about 2.5 wt % based on the total amount of the graphite-silicon composite.

The silicon (Si) particle may have an average particle diameter of about 50 nm to about 300 nm.

The graphite particle may be present in the graphite-silicon composite in an amount of about 72 wt % to about 83 wt % based on the total amount of the graphite-silicon composite.

The graphite particle may have an average particle diameter of about 5 μm to about 20 μm.

The carbon coating layer may be present in the graphite-silicon composite in an amount of about 15 wt % to about 25 wt % based on the total amount of the graphite-silicon composite.

The carbon coating layer may have a thickness of about 0.5 μm to about 2.0 μm.

The negative active material layer may further include a binder and a conductive material, and the silicon (Si) particle may be present in the graphite-silicon composite in an amount of about 1.0 wt % to about 7.5 wt % based on the total amount of the negative active material layer.

Another embodiment of the present invention provides a rechargeable lithium battery including the negative electrode, a positive electrode facing the negative electrode; and an electrolyte solution.

The electrolyte may include an electrolyte solution including a lithium salt, non-aqueous organic solvent, and an additive including fluoroethylene carbonate.

The fluoroethylene carbonate may be present in the electrolyte solution in an amount of about 2 wt % to about 5 wt % based on the total amount of the non-aqueous organic solvent.

The non-aqueous organic solvent may include dimethyl carbonate (DMC).

The dimethyl carbonate (DMC) may be present in the non-aqueous organic solvent in an amount of about 50 volume % to about 70 volume % based on the total amount of the non-aqueous organic solvent.

The non-aqueous organic solvent may have a viscosity of about 0.3 cP to about 5.0 cP.

The rechargeable lithium battery may be configured to be operated at a rate of about 5 C to about 10 C.

Other embodiments of the present invention are included in the following detailed description.

A high power negative electrode for a rechargeable lithium battery and rechargeable lithium battery having uniform (or substantially uniform) current density characteristics may be realized.

BRIEF DESCRIPTION OF THE DRAWINGS

The accompanying drawings, together with the specification, illustrate embodiments of the present disclosure, and, together with the description, serve to explain principles of the present disclosure.

DETAILED DESCRIPTION

Hereinafter, only certain embodiments of the present invention are shown and described by way of illustration.

However, these are example embodiments, and this disclosure is not limited thereto. As those skilled in the art would recognize, the described embodiments may be modified in many ways and should therefore not be construed as limiting. Also, in the context of the present application, when a first element is referred to as being "on" a second element, it can be directly on the second element or be indirectly on the second element with one or more intervening elements therebetween. Like references designate like elements throughout the specification.

A negative electrode for a rechargeable lithium battery according to one embodiment includes a current collector, and a negative active material layer on the current collector. The negative active material layer may include a negative active material including a graphite-silicon composite. In one embodiment, the negative active material may be consisted of a graphite-silicon composite. The graphite-silicon composite may include (or consist of) a graphite particle; a silicon (Si) particle on (e.g., positioned on) a surface of the graphite particle; and a carbon coating layer surrounding (e.g., partially or completely surrounding) the Si particle on the surface of the graphite particle.

Figure 2:
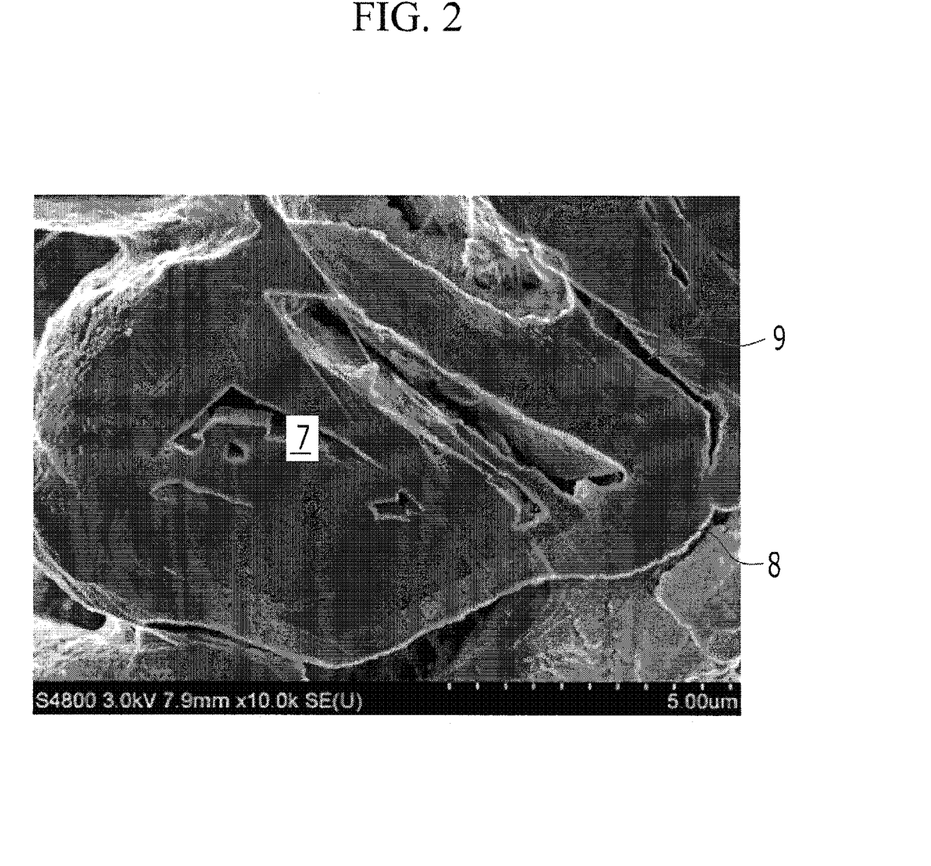
FIG. 2 is a scanning electron microscope (SEM) photograph of a graphite-silicon composite included in a negative active material according to one embodiment.

FIG. 2 is an SEM photograph of an embodiment of the graphite-silicon composite. A structure of the embodiment of the graphite-silicon composite can be seen in FIG. 2.

While FIG. 2 shows one example of the graphite-silicon composite, the present disclosure is not limited thereto.

Referring to FIG. 2, the graphite-silicon composite may include a graphite particle, a silicon (Si) particle on (e.g., positioned on) a surface of the graphite particle, and a carbon coating layer surrounding (e.g., partially or completely surrounding) the Si particle on the surface of the graphite particle.

According to one embodiment of the present invention, a negative active material includes a graphite-silicon composite having a uniform (or substantially uniform) surface. For example, in some embodiments, the carbon coating layer fixes the silicon particle on the surface of the graphite particle (or adheres the silicon particle to the surface of the graphite particle).

The silicon (Si) particle may be included in the graphite-silicon composite in an amount of about 0.5 wt % to about 3.5 wt % based on the total amount of the graphite-silicon composite.

When the silicon (Si) particle is included in the graphite-silicon composite in an amount of greater than about 3.5 wt %, cycle-life of a rechargeable lithium battery including the negative active material may be deteriorated due to volume expansion of the negative active material and exhaustion of an electrolyte. On the other hand, when the silicon (Si) particle is included in the graphite-silicon composite in an amount of less than about 0.5 wt %, an effect of improving capacity of a rechargeable lithium battery may be deteriorated.

For example, the silicon (Si) particle may be included in the graphite-silicon composite in an amount of about 1.0 wt % to about 2.5 wt % based on the total amount of the graphite-silicon composite.

The silicon (Si) particle may have an average particle diameter of about 50 nm to about 300 nm, for example, about 80 nm to about 200 nm. When the silicon (Si) particle has a size (e.g., a nano size) within any of the foregoing ranges, smooth intercalation/deintercalation of lithium ions may decrease ion resistance and suppress volume expansion, thereby improving a cycle-life maintenance rate of a rechargeable lithium battery.

The graphite particle may be included in the graphite-silicon composite in an amount of about 72 wt % to about 83 wt %, for example, about 75 wt % to about 80 wt % based on the total amount of the graphite-silicon composite. When the graphite particle is included within any of the foregoing ranges, an effect of buffering (or inhibiting) volume expansion of the silicon (Si) particle may be increased, and good electrical conductivity may be applied (or achieved), thereby improving a cycle-life maintenance rate of a rechargeable lithium battery.

The graphite particle may have an average particle diameter of about 5 μm to about 20 μm, for example, about 5 μm to about 17 μm. When the graphite particle is included within any of the foregoing ranges, high current discharge characteristics a rechargeable lithium battery may be improved.

The carbon coating layer may be included in the graphite-silicon composite in an amount of about 15 wt % to about 25 wt %, for example, about 18 wt % to about 23 wt % based on the total amount of the graphite-silicon composite. When the carbon coating layer is included within any of the foregoing ranges, an effect of buffering (or inhibiting) volume expansion of the silicon (Si) particle may be increased, and good electrical conductivity may be applied (or achieved), improving a cycle-life maintenance rate of a rechargeable lithium battery.

In addition, the carbon coating layer may have a thickness of about 0.5 μm to about 2.0 μm, for example, about 0.6 μm to about 0.9 μm. When the carbon coating layer has a thickness within any of the foregoing ranges, both the silicon (Si) particle and the graphite particle may be surrounded (e.g., partially or completely surrounded) with (or by) the carbon coating layer, so that the silicon (Si) particle may be firmly attached on (or to) the surface of the graphite particle. Accordingly, while the present disclosure is not limited by any particular mechanism or theory, it is believed that the carbon coating layer together with the graphite particle may play a role of buffering (or inhibiting) volume expansion of the silicon (Si) particle during charge and discharge of a rechargeable lithium battery and thus, may further improve cycle-life characteristics of the rechargeable lithium battery.

Figure 3:
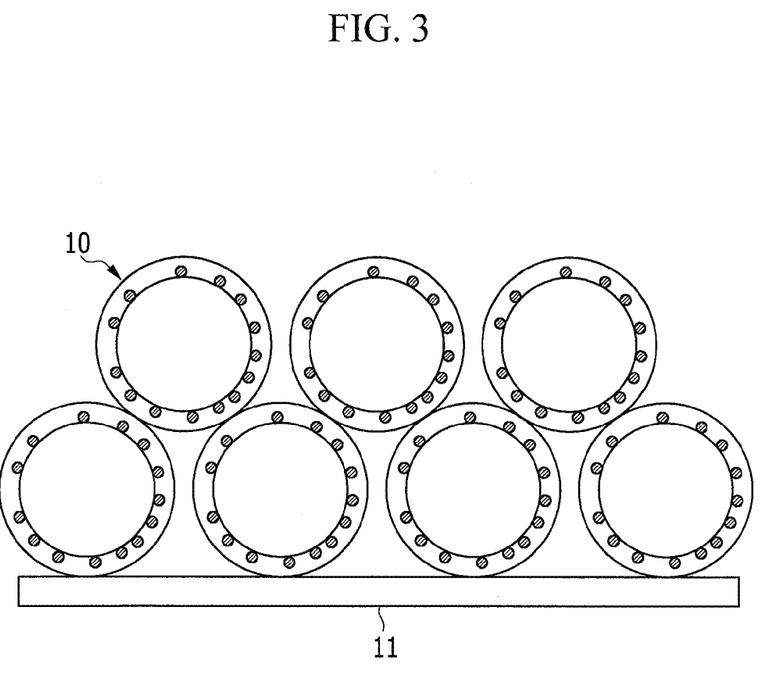
FIG. 3 is a schematic cross-sectional view of a negative electrode according to one embodiment.

A negative electrode according to one embodiment of the present invention is illustrated referring to FIG. 3.

FIG. 3 is a schematic cross-sectional view showing a structure of the negative electrode according to one embodiment.

While FIG. 3 shows one example of the negative electrode, the present disclosure is not limited thereto.

Referring to FIG. 3, the negative electrode according to one embodiment includes a current collector (11) and a negative active material layer on the current collector (11). The negative active material layer may include a negative active material including (or consisting of) the graphite-silicon composite (10) as described above.

Because the negative electrode according to one embodiment of the present invention includes an active material including (or consisting of) the graphite-silicon composite, uniform (or substantially uniform) graphite-silicon composite particles may be uniformly (or substantially uniformly) distributed over an electrode, thereby preventing (or reducing) non-uniform current density over (e.g., flowing through) the electrode and accordingly, preventing (or reducing) deterioration of battery cycle-life and improving cycle-life and output characteristics of the battery.

For example, the graphite-silicon composite particles have a side contact (e.g., an electrical contact between the graphite-silicon composite particles) due to the uniform (or substantially uniform) distribution of the graphite-silicon composite particles and may reduce contact resistance. Also, including a silicon (Si) particle having good electrical conductivity in the graphite-silicon composite and may realize a high-capacity battery.

The negative active material layer includes the graphite-silicon composite.

The negative active material layer may further include a binder and a conductive material. The silicon (Si) particle may be included in the graphite-silicon composite (or the negative active material layer) in an amount of about 1.0 wt % to about 7.5 wt %, for example, about 1.2 wt % to about 5.0 wt % based on the total amount of the negative active material layer. When the silicon (Si) particle is included within any of the foregoing ranges, good electrical conductivity may be applied (or achieved).

The binder may be included in the negative active material layer in an amount of about 1 wt % to about 5 wt % based on the total amount of the negative active material layer. When the conductive material is further included in the negative active material layer, about 90 wt % to about 98 wt % of the negative active material, about 1 wt % to about 5 wt % of the binder, and about 1 wt % to about 5 wt % of the conductive material may be used.

The binder improves the binding properties of the negative active material particles with one another and with the current collector. The binder may be a non-water-soluble binder, a water-soluble binder, or a combination thereof, but the binder is not limited thereto.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof, but the non-water-soluble binder is not limited thereto.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkylester, or a combination thereof, but the water-soluble binder is not limited thereto.

When the water-soluble binder is used as a negative electrode binder, a thickener including a cellulose-based compound may be further used to improve a viscosity of an active material composition for forming the negative active material layer. The cellulose-based compound may include one or more of carboxymethyl cellulose, hydroxypropylmethyl cellulose, methyl cellulose, or alkali metal salts thereof, but the cellulose-based compound is not limited thereto. The alkali metal may be Na, K, or Li, but the alkali metal is not limited thereto. The thickener may be included in the negative active material layer in an amount of about 0.1 parts by weight to about 50 parts by weight based on 100 parts by weight of the binder.

The conductive material improves the conductivity of an electrode. Any suitable, electrically conductive material may be used as a conductive material, unless it causes a chemical change in the rechargeable lithium battery. Examples thereof may include a carbon-based material such as natural graphite, artificial graphite, carbon black, acetylene black, ketjen black, a carbon fiber, and the like; a metal-based material, such as a metal powder or a metal fiber and the like including copper, nickel, aluminum, silver, and the like; a conductive polymer such as a polyphenylene derivative and the like; or a mixture thereof, but the conductive material is not limited thereto.

The current collector may include a copper foil, a nickel foil, a stainless steel foil, a titanium foil, a nickel foam, a copper foam, a polymer substrate coated with a conductive metal, or a combination thereof, but the current collector is not limited thereto.

A rechargeable lithium battery according to another embodiment of the present invention includes the negative electrode; a positive electrode facing the negative electrode; and an electrolyte.

A rechargeable lithium battery having high power characteristics and improved cycle-life characteristics may be realized (or achieved) by using the negative electrode.

The electrolyte may include an electrolyte solution including a lithium salt, a non-aqueous organic solvent, and an additive including fluoroethylene carbonate.

An electrolyte solution including fluoroethylene carbonate may improve storage characteristics at high temperature and decrease the cost of the rechargeable lithium battery.

For example, the fluoroethylene carbonate may be included in the electrolyte solution in an amount of about 2 wt % to about 5 wt %, for example, about 2.5 wt % to about 4 wt % based on the total amount of the non-aqueous organic solvent.

The non-aqueous organic solvent may include dimethyl carbonate (DMC), but the non-aqueous organic solvent is not limited thereto.

The dimethyl carbonate (DMC) may be included in the non-aqueous organic solvent in an amount of about 50 volume % to about 70 volume % based on the total amount of the non-aqueous organic solvent.

Including the dimethyl carbonate (DMC) may provide an electrolyte having low viscosity characteristics. The non-aqueous organic solvent may have a viscosity of about 0.3 cP to about 5.0 cP, for example, about 0.3 cP to about 3.0 cP, or about 0.3 cP to about 1.8 cP.

Electrolyte characteristics that are suitable (or appropriate) for a high power battery may be realized by the low viscosity characteristics of the electrolyte.

The rechargeable lithium battery according to one embodiment of the present invention may be operated at a rate of about 5 C to about 10 C. For example, the rechargeable lithium battery may be applied to (or used with) an electrical tool configured to be operated at high power such as an e-bike (e.g., an electrical assisted bicycle), an electric vehicle (e.g., a hybrid electrical vehicle), and the like.

Hereinafter, a rechargeable lithium battery including the negative electrode is described with reference to FIG. 1.

Figure 1:
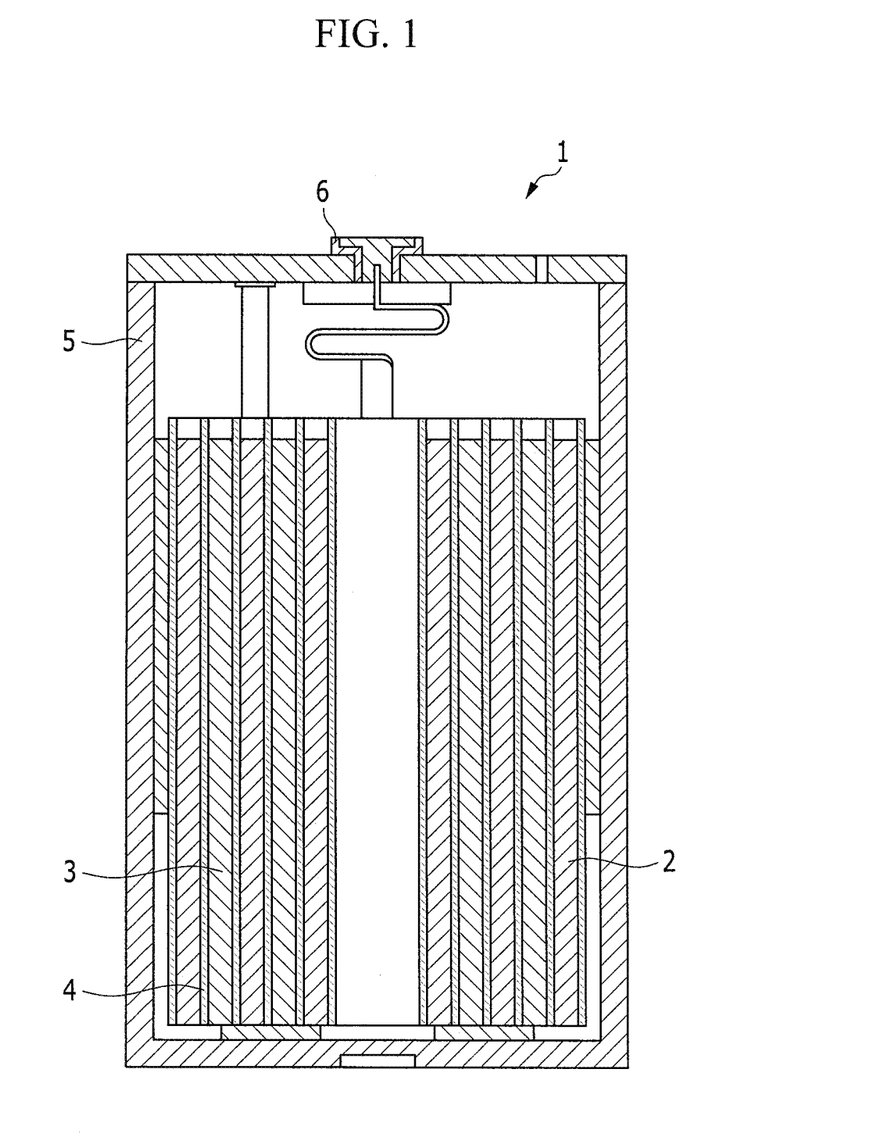
FIG. 1 is a schematic cross-sectional view of a rechargeable lithium battery according to one embodiment.

FIG. 1 is a schematic cross-sectional view of a rechargeable lithium battery according to one embodiment.

Referring to FIG. 1, the rechargeable lithium battery 1 is a prismatic battery that includes an electrode assembly including a positive electrode 2, a negative electrode 3, and a separator 4 positioned between the positive electrode 2 and the negative electrode 3 in a battery case 5, an electrolyte injected though the upper part of the case, and a cap plate 6. The rechargeable lithium battery is not limited to a prismatic shape, and may be any suitable shape, such as a cylindrical, coin-type, or pouch shape as long as the battery includes the negative active material.

The positive electrode includes a current collector and a positive active material layer on the current collector.

The positive electrode material layer includes a positive active material, and the positive active material may include lithiated intercalation compounds that reversibly intercalate and deintercalate lithium ions. For example, the positive active material may be a lithium composite oxide including at least one metal including cobalt, manganese, nickel, or a combination thereof, but the positive active material is not limited thereto. For example, the positive active material may include compounds represented by the following chemical formulae: $Li_aA_{1-b}X_bD$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.05, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $LiSQ_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$ In the above chemical formulae, A is Ni, Co, Mn, or a combination thereof; X is Al, Ni, Co, Mn, Cr, Fe, Mg, Sr, V, a rare earth element, or a combination thereof; D is O, F, S, P, or a combination thereof; E is Co, Mn, or a combination thereof; T is F, S, P, or a combination thereof; G is Al, Cr, Mn, Fe, Mg, La, Ce, Sr, V, or a combination thereof; Q is Ti, Mo, Mn, or a combination thereof; Z is Cr, V, Fe, Sc, Y, or a combination thereof; and J is V, Cr, Mn, Co, Ni, Cu, or a combination thereof.

The positive active material may include a compound having a coating layer on a surface of the compound or the compound may be mixed with compounds having a coating layer. The coating layer may include at least one coating element compound that is an oxide of the coating element, a hydroxide of the coating element, an oxyhydroxide of the coating element, an oxycarbonate of the coating element, or a hydroxyl carbonate of the coating element. The compounds of the coating layer may be amorphous or crystalline. The coating element of the coating layer may include Mg, Al, Co, K, Na, Ca, Si, Ti, V, Sn, Ge, Ga, B, As, Zr, or a mixture thereof, but the coating element is not limited thereto. The coating layer may be formed by a method having no (or substantially no) negative influence on the properties of the positive active material by including the coating layer. For example, the method may include any suitable coating method such as spraying, dipping, and the like. Those of ordinary skill in the art would readily understand how to perform the foregoing coating methods and, therefore, those coating methods are not illustrated in more detail here.

The positive active material may be included in the positive active material layer in an amount of about 80 wt % to about 99 wt % based on the total amount of the positive active material layer. The positive active material layer may further include a binder and a conductive material. Herein, each of the binder and conductive material may be included in the positive active material layer in an amount of about 1 wt % to about 5 wt % based on the total amount of the positive active material layer.

The binder improves the binding properties of the positive active material particles with one another and with a current collector. Examples of the binder may include polyvinyl alcohol, carboxymethyl cellulose, hydroxypropyl cellulose, diacetyl cellulose, polyvinylchloride, carboxylated polyvinylchloride, polyvinyifluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material improves the conductivity of the electrode. Any suitable, electrically conductive material may be used as the conductive material, unless it causes a chemical change in the rechargeable lithium battery. Examples thereof may include a carbon-based material such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative, and the like; or a mixture thereof, but the conductive material is not limited thereto.

The current collector may be Al (aluminum) foil, but the current collector is not limited thereto.

The negative and positive electrodes may be manufactured by a method of mixing the active material, the conductive material, and the binder in a solvent to prepare an active material composition and coating the composition on the current collector. The electrode may be manufactured according to any suitable method generally used in the art, and thus, the method of manufacturing the electrode is not described in more detail here. The solvent includes N-methylpyrrolidone and the like, but the solvent is not limited thereto. For example, when the water-soluble binder is used in the negative electrode, water may be used as the solvent for the preparation of the negative active material composition.

The electrolyte solution includes the lithium salt, the non-aqueous organic solvent, and the additive as described above.

Examples of the lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein, x and y are natural numbers, LiCl, LiI, $LiB(C_2O_4)_2$ (lithium bis(oxalato) borate; LiBOB), or a combination thereof, but the lithium salt is not limited thereto.

The lithium salt may be included in the electrolyte solution at a concentration of about 0.1 M to about 2.0 M. When the lithium salt is included within the above concentration range, it may improve electrolyte performance and lithium ion mobility due to suitable (or optimal) electrolyte conductivity and viscosity.

The non-aqueous organic solvent and the additive are the same as described above.

The electrolyte may further include an other additive including vinylene carbonate, metal fluoride, glutaronitrile, succinonitrile, adiponitrile, 3,3'-thiodipropionitrile, 1,3-propane sultone, 1,3-propene sultone, lithium bis(oxalato)borate, lithium tetrafluorobarate, vinylethylene carbonate, difluoroethylenecarbonate, fluorodimethylcarbonate, fluoroethylmethylcarbonate, or a mixture thereof, but the electrolyte is not limited thereto.

The non-aqueous organic solvent serves as a medium for transmitting ions taking part in the electrochemical reaction of the rechargeable lithium battery. The non-aqueous organic solvent may include a carbonate-based, ester-based, ether-based, ketone-based, alcohol-based, or aprotic solvent, but the non-aqueous organic solvent is not limited thereto.

For example, when the non-aqueous organic solvent includes a mixture of a linear carbonate compound and a cyclic carbonate compound, the non-aqueous organic solvent may have a high dielectric constant and low viscosity.

In some embodiments, the cyclic carbonate and the linear carbonate are mixed together in a volume ratio of about 1:1 to about 1:9.

The lithium salt is dissolved in the non-aqueous organic solvent and supplies lithium ions in the rechargeable lithium battery, and basically operates the rechargeable lithium battery and improves lithium ion transfer between the positive and negative electrodes.

The separator may include any materials generally used in a lithium battery as long as the separator is capable of separating the negative electrode from the positive electrode and providing a transporting passage for lithium ions. In other words, the separator may have a low resistance to ion transport and a good impregnation ability with respect to the electrolyte. For example, the separator may include glass fiber, polyester, TEFLON® (tetrafluoroethylene; TEFLON® is a registered trademark of E. I. Du Pont de Nemours and Company), polyethylene, polypropylene, polytetrafluoroethylene (PTFE), or a combination thereof, but the separator is not limited thereto. The separator may have a form of a non-woven fabric or a woven fabric. For example, for a lithium ion battery, a polyolefin-based polymer separator such as polyethylene, polypropylene or the like may be used. In order to provide (or ensure) suitable heat resistance or mechanical strength, a coated separator including a ceramic component or a polymer material may be used. For example, the separator may have a monolayered or multi-layered structure.

Embodiments of the present invention will now be described by referring to examples. These examples, however, should not in any sense be interpreted as limiting the scope of the present invention.

Manufacture of Rechargeable Lithium Battery Cell

Example 1

2.3 wt % of Si particles (Shenzhen BTR Energy Materials Co., Ltd.) having an average particle diameter of 100 nm and 77.7 wt % of natural graphite (Shenzhen BTR Energy Materials Co., Ltd.) were mixed in an ethanol solvent, and the resultant mixture was dried to obtain a silicon-graphite precursor including a Si particle on the surface of the natural graphite. 20 wt % of coal-based pitch was added to the graphite-silicon precursor, and the resultant mixture was heat-treated at 850° C. under an $N_2$ atmosphere for 2 hours to manufacture a negative active material including a graphite-silicon composite. The negative active material had a structure in which the Si particle on the surface of the natural graphite was surrounded by a 1 μm to 2 μm-thick carbon coating layer. The Si particle was present in the graphite-silicon composite in an amount of 2.3 wt %, the graphite particle was present in the graphite-silicon composite in an amount of 77.7 wt %. Furthermore, the carbon coating layer is present in the graphite-silicon composite in an amount of 20 wt %.

98 wt % of the negative active material was mixed with 1 wt % of carboxylmethyl cellulose, and 1 wt % of a styrene butadiene rubber in distilled water to prepare a slurry. The slurry was coated on a Cu foil current collector and then, dried and compressed according to a method generally used in the art to manufacture a negative electrode.

A positive electrode was manufactured by mixing 96 wt % of a $LiCoO_2$ positive active material, 2 wt % of a polyvinylidene fluoride binder, and 2 wt % of a carbon black conductive material in N-methyl pyrrolidone to prepare a positive active material slurry, coating the slurry on an Al film current collector, and then, drying and compressing according to a method generally used in the art.

The negative and positive electrodes and an electrolyte solution were used to manufacture a prismatic battery cell. The electrolyte solution was prepared using a non-aqueous organic solvent prepared by mixing ethylene carbonate (EC), ethylmethyl carbonate (EMC) and dimethylcarbonate (DMC) (at a volume ratio of 2:2:6) and dissolving 3 wt % (based on the total amount of the non-aqueous organic solvent) of fluoroethylene carbonate (FEC) therein and adding $LiPF_6$ thereto to a concentration of 1.15 M.

Example 2

A rechargeable lithium battery cell was manufactured as in Example 1 except that 1.8 wt % of the Si particles and 78.2 wt % of the natural graphite were used. The Si particle was present in the graphite-silicon composite in an amount of 1.8 wt %, the graphite particle was present in the graphite-silicon composite in an amount of 78.2 wt %. Furthermore, the carbon coating layer is present in the graphite-silicon composite in an amount of 20 wt %.

Comparative Example 1

A negative active material and a rechargeable lithium battery cell were manufactured as in Example 1 except that $SiO_x$ particles having an average particle diameter of 1 μm and graphite particles were used instead of the negative active material including (or consisting of) a graphite-silicon composite in Example 1.

Reference Example 1

15 wt % of Si particles having an average particle diameter of 100 nm (Shenzhen BTR Energy Materials Co., Ltd.) and 65 wt % of natural graphite having an average particle diameter of 9 μm (Shenzhen BTR Energy Materials Co., Ltd.) were mixed in an ethanol solvent and then, dried to obtain a graphite-silicon precursor including the Si particle on the surface of the natural graphite. 20 wt % of coal-based pitch was added to the graphite-silicon precursor, and the resultant mixture was heat-treated at 850° C. under an $N_2$ atmosphere for 2 hours to manufacture a graphite-silicon composite. The graphite-silicon composite had a structure in which the Si particle on the surface of the natural graphite was all surrounded (e.g., completely or substantially completely surrounded) by a 1 μm to 2 μm-thick carbon coating layer. The Si particle was present in the graphite-silicon composite in an amount of 15 wt %, the graphite particle was present in the graphite-silicon composite in an amount of 65 wt %. Furthermore, the carbon coating layer is present in the graphite-silicon composite in an amount of 20 wt %.

A rechargeable lithium battery cell was manufactured as in Example 1 except for mixing 15 wt % of the graphite-silicon composite and 85 wt % of natural graphite having an average particle diameter of 15 μm and drying the resultant mixture to manufacture a negative active material in which the graphite-silicon composite was mixed with the natural graphite.

Evaluation 1: Uniformity of Current Density
(Evaluation Method)
Capacity Distribution per Weight Depending on Position of Negative Electrode Capacity per weight is proportional to current density, and therefore, capacity per weight is a measure of current density uniformity.

The negative electrodes according to Examples 1 and 2, Comparative Examples 1, and Reference Example 1 were each used to manufacture a coin half-cell.

Figure 4:
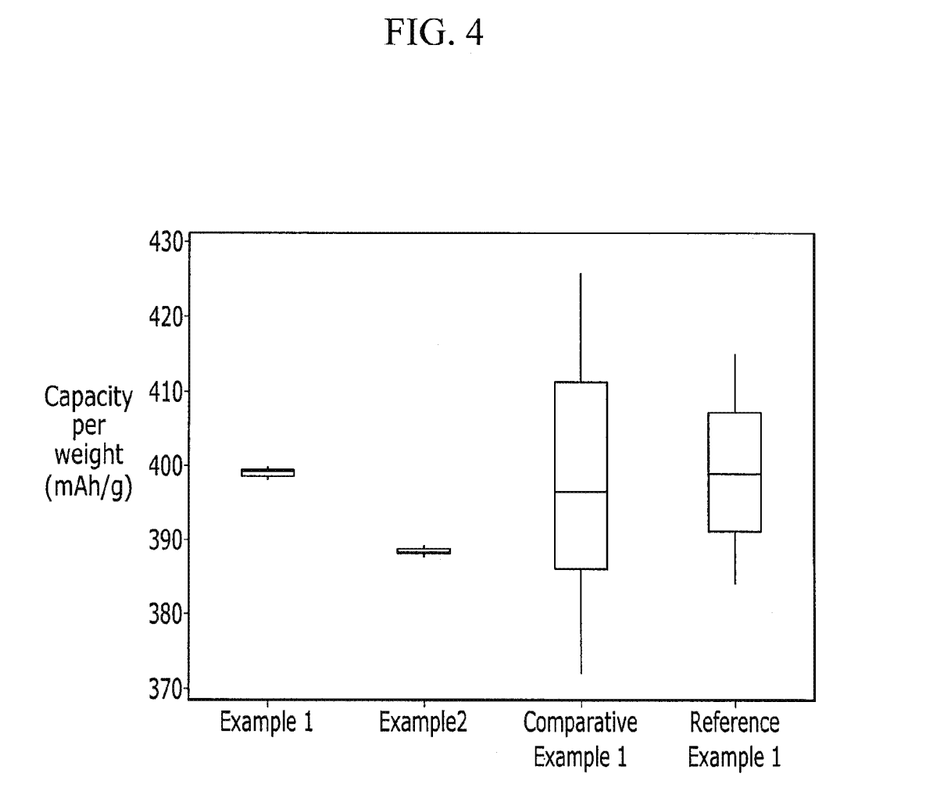
FIG. 4 is a graph showing a capacity-scattering degree per weight.

A disk having a diameter of 14 mm was taken from each of 30 different positions (or locations) of a sheet of each negative electrode according to Examples 1 and 2, Comparative Example 1, and Reference Example 1 and each disk was used as a negative electrode in the manufacture a coin half-cell. Capacity distribution per weight was measured for each of the positions (or locations) of each sheet of the negative electrodes. The results are shown in FIG. 4

Figure 5:
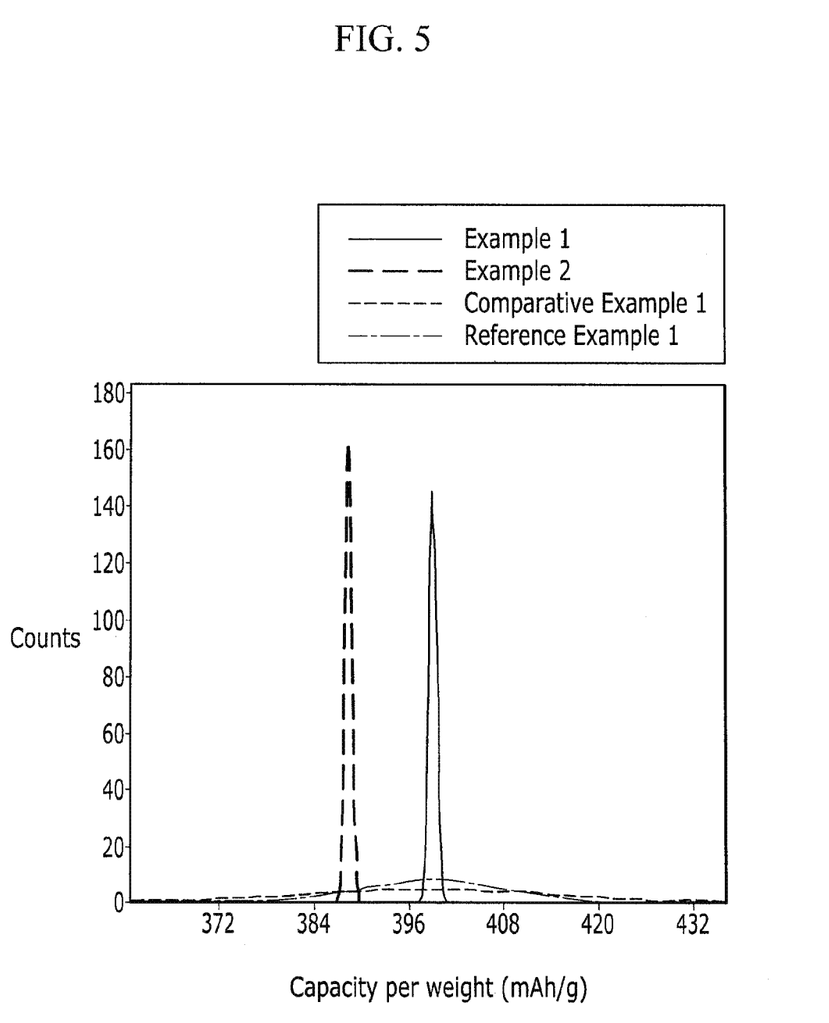
FIG. 5 is a histogram showing counts depending on capacity per weight.

In addition, counts depending on capacity per weight of the negative electrodes according to Examples 1 and 2, Comparative Example 1, and Reference Example 1 are shown in Table 1 and FIG. 5.

(Evaluation Result)

The negative electrodes of Examples 1 and 2 exhibited similar capacity per weight depending on a position of about 399 mAh/g of anticipated capacity per weight converted from the Si amount of the negative active material layer. For example, the negative electrodes of Examples 1 and 2 each exhibited a small capacity-per-weight distribution depending on the position of the sheet of the negative electrode from which the above-referenced disk taken. Examples 1 and 2 each exhibited little variation in their respective capacity-per-weight depending upon the location of the sheet of the negative electrode from which the above-referenced disk was taken. Thus, the negative electrodes of Examples 1 and 2 exhibited good current density uniformity.

On the other hand, the negative electrodes according to Comparative Example 1 and Reference Example 1 showed a large capacity-per-weight distribution. For example, Comparative Example 1 and Reference Example 1 each exhibited a substantial amount of variation in their respective capacity-per-weight depending upon the location of the negative electrode from which the above-referenced disk was taken. Thus, Comparative Example 1 and Reference Example 1 exhibited non-uniform current density as compared with the negative electrodes according to Examples 1 and 2.

FIG. 4 is a graph showing capacity-scattering degree per weight for Examples 1 and 2, Comparative Example 1, and Reference Example 1.

FIG. 5 is a histogram showing counts depending on capacity per weight. Referring to FIGS. 4 and 5, and Table 1, Examples 1 and 2 showed small capacity distribution per weight and thus, good current density uniformity as compared with Comparative Example 1 and Reference Example 1.

TABLE 1

|  | Average (mAh/g) | Standard deviation | Number of samples (N) |
| --- | --- | --- | --- |
| Example 1 | 399.0 | 0.4950 | 30 |
| Example 2 | 388.4 | 0.4371 | 30 |
| Comparative Example 1 | 398.5 | 15.58 | 30 |
| Reference Example 1 | 399.1 | 9.148 | 30 |

From this good current density uniformity, it can be expected that the rechargeable lithium cells according to Examples 1 and 2 can be operated at a rate of about 5 C to about 10 C without any performance deteriorations.

While this invention has been described in connection with what are presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A negative electrode for a rechargeable lithium battery comprising:
   a current collector; and
   a negative active material layer on the current collector, wherein the negative active material layer comprises a negative active material comprising a graphite-silicon composite comprising a graphite particle, a silicon (Si) particle on a surface of the graphite particle, and a carbon coating layer surrounding the Si particle on the surface of the graphite particle, wherein the graphite particle is present in the graphite-silicon composite in an amount of about 72 wt % to about 83 wt % based on the total amount of the graphite-silicon composite.

2. The negative electrode of claim 1, wherein the silicon (Si) particle is present in the graphite-silicon composite in an amount of about 0.5 wt % to about 3.5 wt % based on the total amount of the graphite-silicon composite.

3. The negative electrode of claim 1, wherein the silicon (Si) particle is present in the graphite-silicon composite in an amount of about 1.0 wt % to about 2.5 wt % based on the total amount of the graphite-silicon composite.

4. The negative electrode of claim 1, wherein the silicon (Si) particle has an average particle diameter of about 50 nm to about 300 nm.

5. The negative electrode of claim 1, wherein the graphite particle has an average particle diameter of about 5 μm to about 20 μm.

6. The negative electrode of claim 1, wherein the carbon coating layer is present in the graphite-silicon composite in an amount of about 15 wt % to about 25 wt % based on the total amount of the graphite-silicon composite.

7. The negative electrode of claim 1, wherein the carbon coating layer has a thickness of about 0.5 μm to about 2.0 μm.

8. The negative electrode of claim 1, wherein the negative active material layer further comprises a binder and a conductive material, and
   the silicon (Si) particle is present in the graphite-silicon composite in an amount of about 1.0 wt % to about 7.5 wt % based on the total amount of the negative active material layer.

9. A rechargeable lithium battery comprising:
   the negative electrode of claim 1;
   a positive electrode facing the negative electrode; and
   an electrolyte.

10. The rechargeable lithium battery of claim 9, wherein the electrolyte comprises an electrolyte solution comprising a lithium salt, a non-aqueous organic solvent, and about 2 wt % to about 5 wt % fluoroethylene carbonate based on the total amount of the non-aqueous organic solvent.

11. The rechargeable lithium battery of claim 10, wherein the non-aqueous organic solvent comprises dimethyl carbonate (DMC).

12. The rechargeable lithium battery of claim 11, wherein the dimethyl carbonate (DMC) is present in the non-aqueous organic solvent in an amount of about 50 volume % to about 70 volume % based on the total amount of the non-aqueous organic solvent.

13. The rechargeable lithium battery of claim 10, wherein the non-aqueous organic solvent has a viscosity of about 0.3 cP to about 5.0 cP.

14. The rechargeable lithium battery of claim 10, wherein the rechargeable lithium battery is configured to be operated at a rate of about 5 C to about 10 C.

* * * * *